June 23, 1931.         G. LOENING         1,811,551
HANDLING CARRIAGE FOR AIRPLANE BODIES
Filed Nov. 7, 1930          2 Sheets-Sheet 1
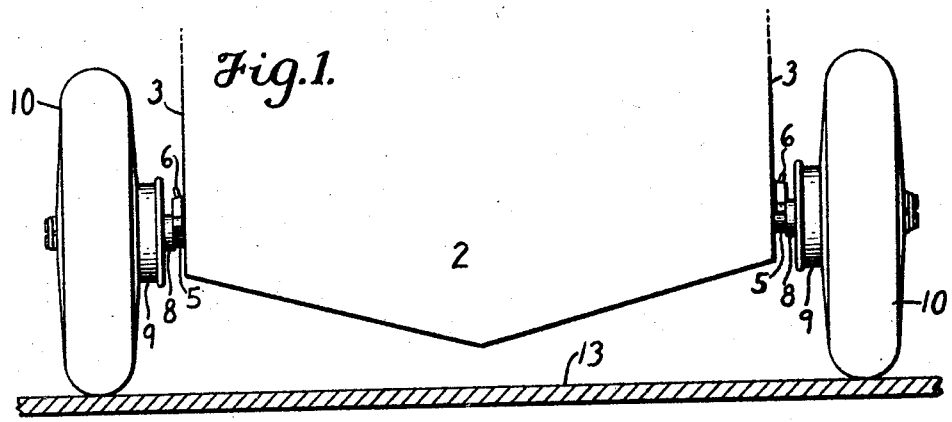
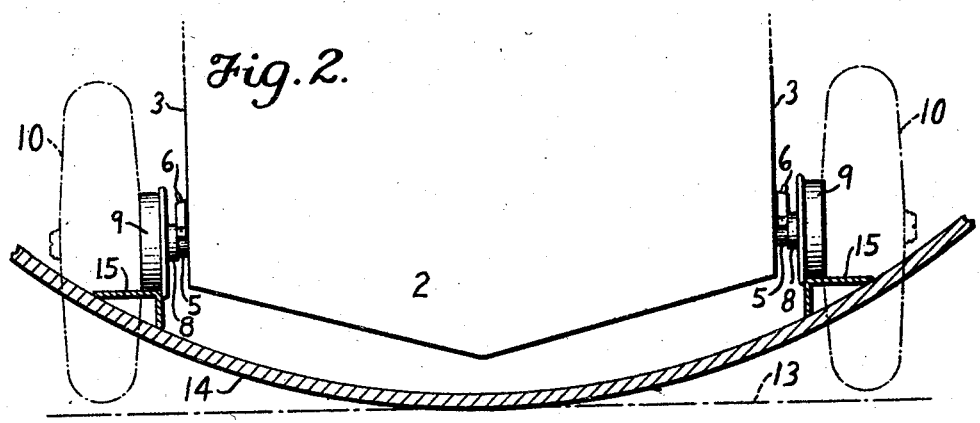
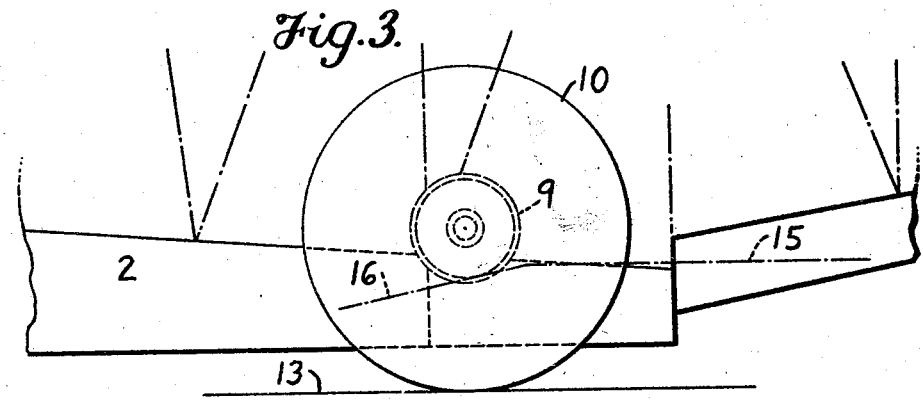
INVENTOR
BY *Grover Loening*
*J. Shaulenburg*
ATTORNEY

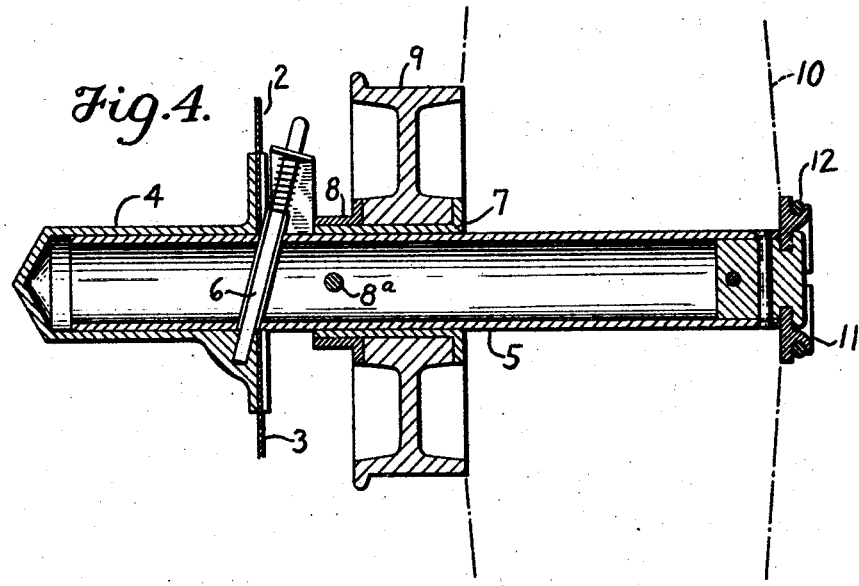
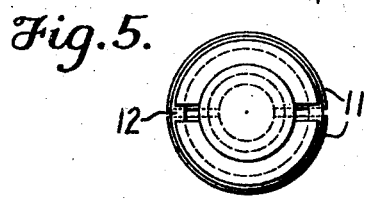
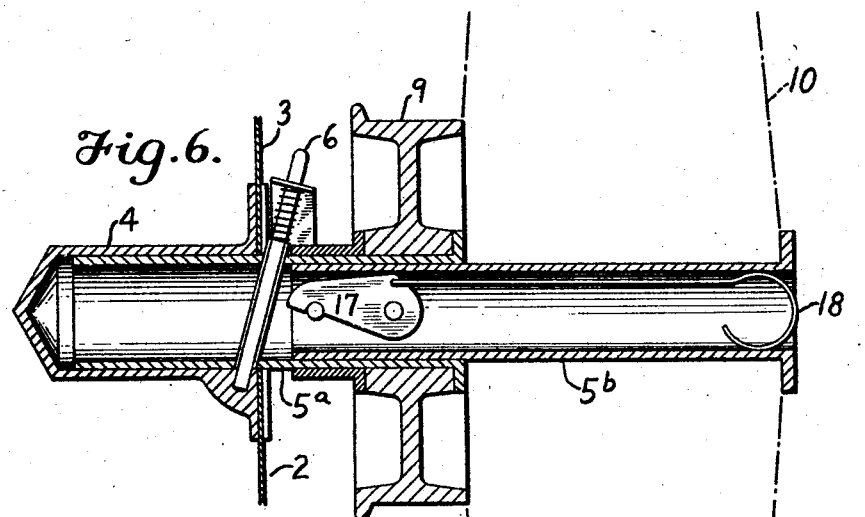

Patented June 23, 1931

1,811,551

UNITED STATES PATENT OFFICE

GROVER LOENING, OF NEW YORK, N. Y.

HANDLING CARRIAGE FOR AIRPLANE BODIES

Application filed November 7, 1930. Serial No. 493,943.

This invention is a handling carriage for stowing flying-boats or other airplanes in confined spaces. The invention is more particularly designed to provide convenient means for introducing an airplane body into a cylindrical tank carried by a submarine, and for withdrawing it from the tank onto the deck.

The carriage of this invention comprises wheel supports applicable to and removable from sockets or their equivalents on the opposite sides of the airplane body, and a large and a small wheel on each carrier, the large wheel being removable, leaving the small wheel in place on the removable support.

The large wheels when in place project below the bottom line of the body, so that the body can be wheeled on a deck or other flat surface, whilst the small wheels are adapted for rolling the body into and out of a cylindrical tank or other berth having a troughed bottom.

In the accompanying drawings, forming part hereof:

Fig. 1 is an end view showing the two parts of the carriage applied to the flotation body of a flying-boat, the large wheels resting on a deck or other flat surface;

Fig. 2 is a similar view showing the small wheels resting on a track inside a tank, the lower part of the tank and the tracks being in section, and the large wheels, which are removed at this time, being indicated in dot-and-dash lines, as is also the deck level;

Fig. 3 is a side elevation corresponding to Fig. 1, only a fragment of the body of the airplane being shown;

Fig. 4 is a sectional view of one of the wheel-carriers, the section being taken in a plane which coincides with the axis, a portion of the side wall of the hull or body being shown in section, and a portion of the large wheel being indicated in dot-and-dash lines;

Fig. 5 is a view looking at the outer end of the wheel support of Fig. 4; and

Fig. 6 is a view corresponding to Fig. 4, illustrating another form of the device.

Figs. 4 and 5, and in connection therewith Figs. 1-3, will first be described. The drawings illustrate the application of the invention to the hull or boat body 2 of a flying-boat, but the invention is not limited to a particular type of heavier-than-air machine.

The side walls 3 of the body have openings and internal thimble sockets 4 are secured to these walls around the openings.

An axle 5 can be inserted in and removed from each of these sockets, and can be locked in the socket by a spring-pressed pin 6. A flanged bushing 7 and ring 8 are fixed to the axle 5, as by means of a pin 8ª, just outside the inner portion of the axle which enters the socket, and a small wheel 9 is rotatably supported on this bushing between the flanges.

A large wheel 10 is rotatably supported on the portion of each axle outside the small wheel, the hub of this wheel being capable of being slipped off the axle when a retainer is released. Figs. 4 and 5 show one form of retainer comprising a two-part flange 11 seated removably in a circumferential groove in the outer end of the axle, and an elastic ring 12 clasping a channel in the parts of the flange.

When the airplane or airplane body is to be rolled on deck or on land, the two units of the handling carriage are connected with the body and both wheels are in place on the axles.

The invention is intended more particularly for handling flying machines, or their bodies minus their wings, on the decks of submarines, and for rolling them into and out of cylindrical tanks in which the bodies are stowed. The numeral 13 indicates a deck, and 14 is a tank secured to the deck, the lower portion of this tank being shown in Fig. 2. Tracks 15 are preferably secured inside the tank, these tracks extending lengthwise and being disposed on the upward slopes of the tank shell above and at opposite sides of the bottom line of the shell. Inclined tracks or spurs are preferably disposed outside of the tank in continuation with the internal tracks, when a body is to be introduced or removed from the tank. It has not been thought necessary to illustrate these tracks beyond indicating them by the dot-and-dash line 16 in Fig. 3. The external tracks may naturally be movable in order to permit closing of the tank.

The large wheels 10 would support the body of the plane too far from the bottom of the tank, because of the upward slopes of the sides of the tank bottom, so that it would be impossible to roll the body into and out of a tank of minimum dimensions on these wheels. Consequently, before pushing the body into the tank, the wheels 10 are removed from the axles 5. At this time the small wheels 9 have ridden up the inclined spurs 16, and the body can then be pushed into the tank, the wheels 9 rolling on the tracks 15.

When the body is withdrawn from the tank, the large wheels 10 are applied to the axle. Before the plane leaves the submarine both units of the carriage are removed.

The unit shown in Fig. 6 is similar to the one already described with the following exceptions: The primary axle 5ª terminates at the outer side of the small wheel 9, and the bushing 7 can be omitted. A supplementary axle 5ᵇ is inserted into the primary axle and is held in place by a releasable catch 17, operable from the open end of the secondary axle by a pull connection 18. This secondary axle carries the large wheel. The secondary axle with the large wheel can, therefore, be removed from the primary axle which carries the small wheel, and the secondary axle with the small wheel can in turn be removed from the body.

I realize that numerous changes can be made in the carrying out of the invention, and it is therefore desired that the drawings and the description be understood as being illustrative of preferred embodiments and not as limiting the scope of the invention set forth in the appended claims.

I claim:

1. Means for handling and stowing airplane bodies, comprising a large and a small wheel applicable to each side of the airplane body, and wheel supports adapted to connect said wheels detachably to the body and to permit the large wheels to be removed while the small wheels remain in place.

2. A handling carriage for stowing airplanes, comprising, in combination with sockets at the sides of the airplane body, wheel supports adapted to be removably applied to said sockets, a small and a large wheel on each wheel support, the small wheel at the inner side of the large wheel and the large wheel being removable from the support leaving the small wheel in place.

3. A handling carriage for stowing airplanes, comprising sockets at the sides of the airplane body, axles insertible in said sockets, releasable fastenings for holding said axles in said sockets, a small wheel on each axle, a large wheel outside of each small wheel, and a detachable connection permitting removal of the large wheels from the axles while the small wheels remain in place.

4. A handling carriage for stowing airplanes, comprising sockets at the sides of the airplane body, axles insertible in said sockets, releasable fastenings for holding said axles in said sockets, a small wheel on each axle, a second axle insertible in each of said axles and carrying a large wheel, and releasable fastenings permitting withdrawal of the secondary axles from the primary axles.

GROVER LOENING.